United States Patent
Skaistis

(10) Patent No.: US 8,584,107 B2
(45) Date of Patent: Nov. 12, 2013

(54) COMPILED DATA FOR SOFTWARE APPLICATIONS

(75) Inventor: Jeffrey B. Skaistis, Tulsa, OK (US)

(73) Assignee: United Parcel Service of America, Inc., Atlanta, GA (US)

( * ) Notice: Subject to any disclaimer, the term of this patent is extended or adjusted under 35 U.S.C. 154(b) by 1718 days.

(21) Appl. No.: 11/827,062

(22) Filed: Jul. 9, 2007

(65) Prior Publication Data

US 2008/0127139 A1 May 29, 2008

Related U.S. Application Data

(60) Provisional application No. 60/819,223, filed on Jul. 7, 2006.

(51) Int. Cl.
*G06F 9/44* (2006.01)

(52) U.S. Cl.
USPC .......................................................... 717/143

(58) Field of Classification Search
None
See application file for complete search history.

(56) References Cited

U.S. PATENT DOCUMENTS

| | | | |
|---|---|---|---|
| 4,949,272 A | 8/1990 | Vanourek et al. | |
| 5,063,506 A | 11/1991 | Brockwell et al. | |
| 5,117,364 A | 5/1992 | Barns-Slavin et al. | |
| 5,337,246 A | 8/1994 | Carroll et al. | |
| 5,375,241 A | 12/1994 | Walsh | |
| 5,448,641 A | 9/1995 | Pintsov et al. | |
| 5,485,369 A | 1/1996 | Nicholls et al. | |
| 5,557,518 A | 9/1996 | Rosen | |
| 5,631,827 A | 5/1997 | Nicholls et al. | |
| 5,661,653 A | 8/1997 | Kulik | |
| 5,666,284 A * | 9/1997 | Kara | 705/402 |
| 5,668,990 A * | 9/1997 | Bajorinas et al. | 1/1 |
| 5,694,590 A | 12/1997 | Thuraisingham et al. | |

(Continued)

FOREIGN PATENT DOCUMENTS

| | | |
|---|---|---|
| GB | 2331001 A | 5/1999 |
| GB | 2331384 A | 5/1999 |

(Continued)

OTHER PUBLICATIONS

Gisli Hjalmtysson, Robert Gray, "A lightweight mechanism to update code in a running program," Dynamic C++classes, Usenix Annual Technical Conference (No. 98), 1998, pp. 1-18, Jun. 15-19, 1998, New Orleans, LA.

(Continued)

*Primary Examiner* — Wei Zhen
*Assistant Examiner* — Matthew Brophy
(74) *Attorney, Agent, or Firm* — Alston & Bird LLP

(57) ABSTRACT

Various embodiments of the present invention provide systems and methods of converting data used for shipment rate calculations into executable code. More specifically, certain embodiments if the present invention provide systems and methods of converting data used for shipment calculations into executable code by scanning the data from at least one source file, parsing the data in accordance with a template, and generating the executable code by utilizing the parsed data. As a result, the code may be executed to provide the data used for shipment rate calculations without having to access the original source file. In addition, compiling such data into executable code may improve look-up performance, may provide encapsulation of logic related to the specific nature of the data, and may provide a mechanism by which the raw data is not overtly exposed to end users of the software and third-parties.

22 Claims, 13 Drawing Sheets

(56) References Cited

U.S. PATENT DOCUMENTS

| | | | |
|---|---|---|---|
| 5,712,787 A * | 1/1998 | Yeung | 705/7.29 |
| 5,715,398 A | 2/1998 | Lubenow et al. | |
| 5,721,832 A | 2/1998 | Westrope et al. | |
| 5,745,886 A | 4/1998 | Rosen | |
| 5,758,328 A | 5/1998 | Giovannoli | |
| 5,774,553 A | 6/1998 | Rosen | |
| 5,787,402 A | 7/1998 | Potter et al. | |
| 5,799,151 A | 8/1998 | Hoffer | |
| 5,852,813 A * | 12/1998 | Guenther et al. | 705/408 |
| 5,878,139 A | 3/1999 | Rosen | |
| 5,878,400 A | 3/1999 | Carter, III | |
| 5,884,097 A * | 3/1999 | Li et al. | 710/43 |
| 5,897,621 A | 4/1999 | Boesch et al. | |
| 5,919,247 A | 7/1999 | Van Hoff et al. | |
| 6,012,065 A | 1/2000 | Boucher et al. | |
| 6,018,725 A | 1/2000 | Boucher et al. | |
| 6,035,289 A | 3/2000 | Chou et al. | |
| 6,041,319 A * | 3/2000 | Bass et al. | 705/409 |
| 6,049,671 A | 4/2000 | Slivka et al. | |
| 6,061,667 A | 5/2000 | Danford-Klein et al. | |
| 6,065,673 A | 5/2000 | Kokkila | |
| 6,078,889 A * | 6/2000 | Boucher et al. | 705/10 |
| 6,169,977 B1 | 1/2001 | Hasbani et al. | |
| 6,233,568 B1* | 5/2001 | Kara | 705/410 |
| 6,272,536 B1 | 8/2001 | Van Hoff et al. | |
| 6,282,525 B1* | 8/2001 | Kubatzki et al. | 705/410 |
| 6,286,009 B1* | 9/2001 | Mattioli et al. | 1/1 |
| 6,321,214 B1* | 11/2001 | Thiel | 705/408 |
| 6,460,020 B1 | 10/2002 | Pool et al. | |
| 6,462,286 B1 | 10/2002 | Schwartz et al. | |
| 6,466,948 B1 | 10/2002 | Levitsky et al. | |
| 6,493,871 B1 | 12/2002 | McGuire et al. | |
| 6,594,822 B1 | 7/2003 | Schweitz et al. | |
| 6,629,315 B1 | 9/2003 | Naylor | |
| 6,718,350 B1* | 4/2004 | Karbowski | 707/695 |
| 6,760,908 B2 | 7/2004 | Ren | |
| 6,873,978 B1* | 3/2005 | Boucher et al. | 705/401 |
| 6,895,401 B2 | 5/2005 | Skinner et al. | |
| 6,901,417 B2 | 5/2005 | Anglin et al. | |
| 6,909,890 B2 | 6/2005 | Iyer | |
| 6,925,476 B1 | 8/2005 | Multer et al. | |
| 6,944,855 B2 | 9/2005 | Konas | |
| 6,944,857 B1 | 9/2005 | Glaser et al. | |
| 6,976,163 B1 | 12/2005 | Hind et al. | |
| 7,035,832 B1* | 4/2006 | Kara | 705/408 |
| 7,319,990 B1 | 1/2008 | Henty | |
| RE40,924 E * | 9/2009 | Nicholls et al. | 705/28 |
| 7,676,376 B2 * | 3/2010 | Colman | 705/1.1 |
| 7,711,650 B1* | 5/2010 | Kara | 705/60 |
| 7,774,284 B2* | 8/2010 | Williams et al. | 705/300 |
| 7,818,267 B1* | 10/2010 | Bilibin et al. | 705/335 |
| 2002/0010665 A1 | 1/2002 | Lefebvre et al. | |
| 2002/0032573 A1* | 3/2002 | Williams et al. | 705/1 |
| 2002/0046191 A1 | 4/2002 | Joao | |
| 2002/0049622 A1 | 4/2002 | Letitich et al. | |
| 2002/0116273 A1 | 8/2002 | Sundel | |
| 2002/0138392 A1* | 9/2002 | LeBlanc | 705/37 |
| 2003/0105704 A1 | 6/2003 | Sundel | |
| 2003/0236735 A1* | 12/2003 | Brennan et al. | 705/37 |
| 2004/0015392 A1 | 1/2004 | Hammel et al. | |
| 2004/0024739 A1 | 2/2004 | Copperman et al. | |
| 2004/0143605 A1 | 7/2004 | Jupin et al. | |
| 2004/0194056 A1* | 9/2004 | Combs et al. | 717/104 |
| 2004/0254808 A1* | 12/2004 | Bennett et al. | 705/1 |
| 2004/0267675 A1* | 12/2004 | Burton et al. | 705/400 |
| 2005/0171871 A1* | 8/2005 | Mizushima et al. | 705/28 |
| 2005/0197892 A1* | 9/2005 | Bilibin et al. | 705/13 |
| 2005/0222853 A1 | 10/2005 | Black et al. | |
| 2006/0095354 A1* | 5/2006 | Hamzy et al. | 705/35 |
| 2006/0101425 A1* | 5/2006 | Donovan et al. | 717/136 |
| 2006/0225072 A1* | 10/2006 | Lari et al. | 717/175 |
| 2007/0073551 A1 | 3/2007 | Williams et al. | |
| 2007/0198279 A1* | 8/2007 | Hallas et al. | 705/1 |
| 2007/0299686 A1 | 12/2007 | Hu et al. | |
| 2007/0299732 A1* | 12/2007 | Gluzberg et al. | 705/26 |
| 2008/0162304 A1* | 7/2008 | Ourega | 705/27 |
| 2009/0089125 A1 | 4/2009 | Sultan | |

FOREIGN PATENT DOCUMENTS

| | | |
|---|---|---|
| GB | 2331601 | 5/1999 |
| GB | 2331602 A | 5/1999 |
| WO | WO 00/29995 | 5/2000 |
| WO | WO 03/030056 | 4/2003 |

OTHER PUBLICATIONS

Jonathan Cook, Allessandro Orso, "MonDe: Safe updating through monitored deployment of new component versions," Copyright 2005, 4 pages, Las Cruces, NM; Atlanta, GA.

Michael J. Retting, Martin Fowler, Java World Floating Innovation, "Reflection vs code generation, Avoid runtime reflection when marshaling data," Nov. 2, 2001, pp. 1-9.

Dominic Duggan, Zhaobin Wu, "Adaptable objects for dynamic Updating of software libraries (abstract)," 7 pages, Hoboken, NJ.

Donald Bales, O'Reilly Media, Inc., "Top Ten Oracle JDBC Tips," Dec. 19, 2001, pp. 1-4.

International Search Report dated Sep. 25, 2008, for PCT/US2007/15731, filed Jul. 9, 2007.

Xporta, About Xporta, Retrieved Dec. 29, 2000 from Internet Site http://xporta.com/about/index.html, p. 1 f 1.

Xporta, Solutions, Retrieved Dec. 29, 2000 from Internet Site http://xporta.com/solutions/index.html, p. 1 of 1.

Xporta, Xporta Products, Retrieved Dec. 29, 2000 from Internet Site http://xporta.com/solutions/products.html, p. 1 of 1.

Coia, "International Efficiencies: Trade Logistics Software Increases . . . " *MSI*, Apr. 2002, p. 20, v. 20, No. 4, Tradesphere Importer.

"GE Information Services Launches Cargo Link EDI Service for Shippers," *Computergram International*, Mar. 2, 1990, Issue No. 0268-716X.

Sweat, "Ship It (WineSmart.com Inc.) (Company Operations)," *Information Week*, Jan. 22, 2001, Issue No. 8750-6874.

Wheatman, "Just Getting Started: Worldwide Traders Testing EDI Maintain Their Motivation Despite Complexities and Obstacles," *Software Magazine*, Mar. 15, 1988, pp. 52-56, vol. 8, No. 4.

Chabrow, "Supply Chains Go Global—The Internet Levels the Geographic Playing Field and Lets Companies Reach into the Farthest Corners of the Planet for Partners and Customers,"*Information Week*, Apr. 3, 2000, pp. 50, Issue No 0010-4841.

"HK Trade and Transport EDI Launch set for July," *Newsbytes*, Mar. 20, 1995.

Dawne, "All Information is Local, IT Systems can Connect Every Corner of the Globe, but IT Manager are Learning they have to Pay Attention to Regional Differences," *Computerworld*, Apr. 10, 2000, pp. 88.

Homeland Security Rules Heighten Need for Supply-Chain Automation, As U.S. Customs Plans Stiffer Enforcement of Rules Governing Shipments to the Nation's Ports, U.S. Shippers Conducting International Business will Likely be Required to Implement More automated Supply-Chain Event Management and Transportation Management Systems, *InternetWeek*, May 1, 2003, Issue No. 1096-9969.

PR Newswire, Xporta Redefines Landed Cost With its Introduction of the First Real-Tie Solution for Domestic and International Shipments of all Commodities; Xporta Launches the Landmark Web-Based Decision-Support Solution That Enables Buyers, Suppliers and e-Marketplace to Quote Universal Landed Cost, Sep. 27, 2000, 5 pages, PR Newswire.

Charles W. Thurston, Mercosur's Size Requires Multiplicity in Ventures, Journal of Commerce, 5 Edition, Mar. 17, 1999, p. 7A, New York.

Christy Hudgins, International E-Commerce, Network Computing, Nov. 15, 1999, pp. 75-92.

Torrence, Dale O., "The Harmonized System of Tariff Classification: How It Will Help U.S. Exporters," Business America (pre-1986), May 13, 1985; 8, 000010; ABI/INFORM Global, pp. 22-24.

(56) References Cited

OTHER PUBLICATIONS

Network Computing web pages "International E-Commerce" pp. 1-2 (online), Nov. 15, 1999 (retrieved on Jun. 6, 2002). Retrieved from the Internet: <URL: http//www.networkcomputing.com/1023/1023[24.html]>.

Network computing web pages. "International E-Commerce Governing Who Goes Global" pp. 1-2 (online), Nov. 15, 1999 (retrieved on Jun. 6, 2002). Retrieved from the Internet: <URL: http//www.networkcomputing.com/1023/1023[24.html]>.

Network Computing web pages. "Shippers Try Software to Tally Foreign Tariffs" pp. 1-3 [online], Dec. 20, 1999 [retrieved on Jun. 6, 2002. Retrieved from the Internet: <URL: http//www.networkcomputing.com/1999/story/0.11280.37919.00.html>.

SupplyChainBrain.com web pages. "The Level of Detail Determines Accuracy in Computing Landed Cost" pp. 1-4 [online], Apr. 2001 [retrieved on Jun. 6, 2002]. Retrieved from the Internet: http//www.supplychainbrain.com/archives/4.01.opinion.htm?adcode=30>.

SupplyChainBrain.com web pages. "The supply Chain e-business Top 100 Plan: Supply-Chain Planning Builds on Its Success" pp. 1-4 [online], Jun. 2001 [retrieved on Jun. 6, 2002]. Retrieved from the Internet: http//www.glscs.com/archives/6.01.Plann100.htm?adcode=80>.

ManufacturingSystems.com web pages. "International efficiencies, Trade logistics software increases supply chain visibility, aids sourcing across national boundaries," pp. 1-3 [online][retrieved on Jun. 6, 2002]. Retrieved from the Internet: http://www.manufacturingsystems.com/newsletter/012802/sb0128.asp>.

Arzoon Life Solutions web pages. "Total Landed Costs Calculator," pp. 1-2 [online] [retrieved on Jun. 6, 2002]. Retrieved from the Internet: <http://www.arzoon.com/als_TotalLanded CostCalculator.html>.

"Supply Chain Network Optimization," Genesis Solutions, 8 pages, <http://www.genesissolutions.com>.

"Logistics Execution for Global Trade," TRADEPAQ Corporation, 2 pages, © 1999-2002 by TRADEPAQ Corporation.

Widesoft Systems web pages. "Widesoft B2B Solutions" pp. 1-4 [online] [retrieved on Jun. 6, 2002] Retrieved from the Internet <http://www.widesoft.com/br/site/english>.

Worldwide Retail Exchange web pages. "WorldWide Trade Logistics," 2 pages [online], [retrieved on Jun. 6, 2002] Retrieved from the Internet: <http://www.worldwideretailexchange.org/cs/en US/exchange/wr36000.html>.

Business Wire, "Fritz Offers Faster Duty and Tax Information to Clients; Takes Orders for New Proprietary Trade Cost Model," 4 pages, Feb. 10, 1999.

ITS America web pages, "Syntra Technologies launches Global Commerce Management Initiative," pp. 1-4, [online][retrieved on Jun. 6, 2002]Retrieved from Internet: <http://itsa.org/ITSNEWS.NSF/4c0650bef6193b.../cc83903ba39f97852567da00407b7d?OpenDocment >.

NextLinx web pages, "Supplylinks Chooses NetxLinx to Extend Global Transportation Solution," pp. 1-3 [online][retrieved on Jun. 6, 2002] Retrieved from Internet: <http://nextlinx.com/prs_rel3_20.html >.

Qiva web pages, "Qiva Rolls Out Integrated Product Strategy; Launches New Web Site and Corporate Identity," pp. 1-2 [online][retrieved Jun. 6, 2002] Retrieved from Internet: <http://www.qiva.com/news/prbrand711.html>.

From2com, Jul. 1999, Forms Strategic Alliance With Subasta.com, PR Newswire.

Hickey, Kathleen, Vendors discuss how their technology can help you, Sep. 22, 2003, Traffic World, p. L12. Dialog reference 0006293840.

Dialog Global Reporter, NetSuite Announces NetSuite 9.5, Apr. 29, 2004, Dialog reference 35273723.

Office Action from U.S. Appl. No. 09/939,206 mailed Dec. 30, 2010.
Office Action from U.S. Appl. No. 11/874,681 mailed Sep. 20, 2010.
Office Action from U.S. Appl. No. 09/939,206 mailed May 12, 2010.
Office Action from U.S. Appl. No. 11/874,681 mailed Apr. 1, 2010.
Office Action from U.S. Appl. No. 09/939,206 mailed Nov. 16, 2006.
Office Action from U.S. Appl. No. 09/939,206 mailed Jun. 7, 2006.
Office Action from U.S. Appl. No. 09/939,206 mailed Dec. 1, 2005.
Office Action from U.S. Appl. No. 09/939,206 mailed Apr. 6, 2005.
Office Action from U.S. Appl. No. 09/939,206 mailed Jun. 17, 2004.
Office Action for U.S. Appl. No. 09/939,206 mailed Aug. 5, 2011.
Office Action dated Aug. 5, 2011, for U.S. Appl. No. 09/939,206, filed Aug. 24, 2001.

United States Patent and Trademark Office, Notice of Allowance for U.S. Appl. No. 11/874,681, dated Aug. 20, 2012, 24 pages, USA.

* cited by examiner

```
// Zone format:  GND[.3DA.2DA.2AM.NDS.NDA]
[Chart("CHART_741")]
[Domestic("UNITED_STATES")]
[Service("ALL")]
[Layout("PZ")]
[EffectiveDate("01/02/2006")]
[OriginPostal("74100-74199")]
00400,   00599,   6
00600,   00899,   4
00900,   00999,   4
01000,   03999,   6
04000,   04999,   7
05000,   08999,   6
10000,   13999,   6
14000,   14399,   5
14400,   14699,   6
14700,   14799,   5
14800,   14999,   6
15000,   16799,   5
16800,   21499,   6
21500,   21599,   5
21600,   22599,   6
22600,   22999,   5
23000,   23899,   6
23900,   27899,   5
27900,   27999,   6
28000,   28399,   5
28400,   28499,   6
28500,   30699,   5
30700,   30799,   4
30800,   32899,   5
32900,   33499,   6
33500,   33899,   5
33900,   33999,   6
34100,   34199,   6
34200,   34799,   5
34900,   34999,   6
35000,   36299,   4
36300,   36399,   5
36400,   36799,   4
36800,   36899,   5
36900,   37499,   4
37500,   37599,   3
37600,   37999,   5
38000,   38199,   3
38200,   38599,   4
38600,   38699,   3
38700,   39799,   4
39800,   39899,   5
39900,   39999,   5
40000,   40299,   4
40300,   41899,   5
42000,   42799,   4
43000,   45999,   5
```

FIG. 6
(Zone Source File)

```
// Rate Chart Number: 000167
[Chart("GND")]
[EffectiveDate("1/2/2006")]
[Header("ZONE")]
[Prefix("WEIGHT")]
[Currency("USD")]
     2,     3,     4,     5,     6,     7,     8,     9,    10,    11
 1,  3.80,  3.88,  4.00,  4.16,  4.38,  4.45,  4.56,  14.04, 14.04, 25.44
 2,  3.84,  4.07,  4.47,  4.54,  4.88,  5.00,  5.30,  15.68, 15.68, 26.97
 3,  3.87,  4.26,  4.70,  4.85,  5.22,  5.39,  5.88,  17.13, 17.13, 28.42
 4,  3.98,  4.41,  4.96,  5.17,  5.52,  5.70,  6.26,  18.66, 18.66, 30.06
 5,  4.25,  4.49,  5.20,  5.41,  5.77,  6.01,  6.64,  20.47, 20.47, 31.87
 6,  4.32,  4.68,  5.29,  5.58,  5.96,  6.25,  6.87,  22.46, 22.46, 33.85
 7,  4.57,  4.82,  5.42,  5.77,  6.18,  6.50,  7.18,  24.09, 24.09, 35.48
 8,  4.74,  4.98,  5.56,  5.91,  6.39,  6.81,  7.68,  25.84, 25.84, 37.13
 9,  4.89,  5.13,  5.68,  6.06,  6.56,  7.18,  8.18,  27.74, 27.74, 38.90
10,  5.06,  5.16,  5.82,  6.23,  6.83,  7.69,  8.74,  29.49, 29.49, 40.69
11,  5.23,  5.41,  5.93,  6.40,  7.12,  8.24,  9.36,  31.31, 31.31, 42.42
12,  5.38,  5.59,  6.06,  6.57,  7.45,  8.79,  10.05, 32.85, 32.85, 44.24
13,  5.56,  5.77,  6.17,  6.72,  7.81,  9.35,  10.72, 34.31, 34.31, 45.70
14,  5.67,  5.95,  6.29,  6.87,  8.24,  9.90,  11.40, 35.87, 35.87, 47.16
15,  5.82,  6.14,  6.40,  7.03,  8.68,  10.46, 12.07, 37.33, 37.33, 48.62
16,  5.85,  6.25,  6.50,  7.18,  9.01,  10.90, 12.61, 39.17, 39.17, 50.32
17,  5.94,  6.46,  6.70,  7.47,  9.47,  11.43, 13.27, 40.81, 40.81, 51.97
18,  6.04,  6.67,  6.92,  7.85,  9.92,  11.95, 13.94, 42.65, 42.65, 53.80
19,  6.19,  6.89,  7.18,  8.21,  10.37, 12.48, 14.62, 44.39, 44.39, 55.53
20,  6.32,  7.12,  7.43,  8.59,  10.83, 13.01, 15.30, 46.03, 46.03, 57.18
21,  6.47,  7.34,  7.67,  8.95,  11.27, 13.53, 15.97, 47.40, 47.40, 58.83
```

FIG. 7A
(Rate Source File)

```
// Rate Chart Number: 000185
[Chart("GND_CWT_1")]
[EffectiveDate("1/2/2006")]
[Header("ZONE")]
[Prefix("WEIGHT")]
         2,      3,      4,      5,      6,      7,      8,      9,     10,     11
0,       41.00,  41.00,  45.00,  45.00,  45.00,  45.00,  45.00,  225.00, 225.00, 275.00
<500,    15.00,  19.50,  23.90,  28.80,  34.15,  38.80,  43.45,  122.90, 122.90, 145.20
<1000,   12.85,  16.85,  20.60,  24.85,  29.50,  33.40,  37.35,  105.20, 105.20, 123.90
9999999, 13.10,  17.25,  21.10,  25.45,  30.05,  34.10,  38.20,  107.35, 107.35, 126.70

// Rate Chart Number: 000185
[Chart("GND_CWT_2")]
[EffectiveDate("1/2/2006")]
[Header("ZONE")]
[Prefix("WEIGHT")]
         2,      3,      4,      5,      6,      7,      8,      9,     10,     11
0,       41.00,  41.00,  45.00,  45.00,  45.00,  45.00,  45.00,  225.00, 225.00, 275.00
<500,    16.10,  21.00,  25.50,  30.35,  36.20,  41.15,  45.95,  129.30, 129.30, 152.75
<1000,   14.00,  18.25,  22.15,  26.50,  31.60,  35.90,  40.10,  112.35, 112.35, 132.30
9999999, 14.25,  18.70,  22.65,  26.95,  32.25,  36.55,  40.90,  114.35, 114.35, 134.90
```

FIG. 7B
(Rate Source Files)

```
// Rate Chart Number: 000185
[Chart("GND_CWT_3")]
[EffectiveDate("1/2/2006")]
[Header("ZONE")]
[Prefix("WEIGHT")]
         2,      3,      4,      5,      6,      7,      8,      9,     10,     11
0,      41.00,  41.00,  45.00,  45.00,  45.00,  45.00,  45.00, 225.00, 225.00, 275.00
<500,   16.95,  22.15,  26.75,  32.40,  39.00,  44.70,  50.35, 141.45, 141.45, 167.05
<1000,  14.90,  19.55,  23.50,  28.50,  34.25,  39.35,  44.25, 123.70, 123.70, 145.65
9999999,15.35,  19.90,  23.95,  29.15,  35.00,  40.20,  45.25, 126.15, 126.15, 148.85

// Rate Chart Number: 000185
[Chart("GND_CWT_4")]
[EffectiveDate("1/2/2006")]
[Header("ZONE")]
[Prefix("WEIGHT")]
         2,      3,      4,      5,      6,      7,      8,      9,     10,     11
0,      41.00,  41.00,  45.00,  45.00,  45.00,  45.00,  45.00, 225.00, 225.00, 275.00
<500,   18.05,  23.50,  28.25,  34.75,  41.50,  47.40,  53.30, 149.80, 149.80, 176.95
<1000,  16.10,  20.90,  25.15,  30.90,  37.15,  42.35,  47.65, 133.30, 133.30, 156.95
9999999,16.40,  21.45,  25.60,  31.55,  37.85,  43.20,  48.60, 135.60, 135.60, 160.00
```

FIG. 7C
(Rate Source Files)

```
// Rate Chart Number: 000185
[Chart("GND_CWT_5")]
[EffectiveDate("1/2/2006")]
[Header("ZONE")]
[Prefix("WEIGHT")]
         2,      3,      4,      5,      6,      7,      8,      9,     10,     11
0,      41.00,  41.00,  45.00,  45.00,  45.00,  45.00,  45.00, 225.00, 225.00, 275.00
<500,   19.00,  24.90,  30.10,  37.10,  44.10,  50.65,  57.20, 160.75, 160.75, 189.90
<1000,  17.25,  22.55,  27.20,  33.70,  40.00,  46.10,  52.10, 145.80, 145.80, 171.70
9999999, 17.55, 23.00,  27.80,  34.40,  40.80,  47.00,  53.15, 148.35, 148.35, 175.10

// Rate Chart Number: 000185
[Chart("GND_CWT_6")]
[EffectiveDate("1/2/2006")]
[Header("ZONE")]
[Prefix("WEIGHT")]
         2,      3,      4,      5,      6,      7,      8,      9,     10,     11
0,      44.75,  44.75,  47.50,  47.50,  47.50,  47.50,  47.50, 300.00, 300.00, 325.00
<500,   20.10,  26.40,  32.20,  39.70,  47.20,  54.10,  61.00, 171.70, 171.70, 202.80
<1000,  18.70,  24.60,  30.05,  36.95,  43.95,  50.50,  56.75, 159.05, 159.05, 187.30
9999999, 19.10, 25.10,  30.65,  37.65,  44.85,  51.40,  58.00, 162.05, 162.05, 191.25
```

FIG. 7D
(Rate Source Files)

```
// Rate Chart Number: 000185
[Chart("GND_CWT_7")]
[EffectiveDate("1/2/2006")]
[Header("ZONE")]
[Prefix("WEIGHT")]
          2,       3,       4,       5,       6,       7,       8,       9,      10,      11
0,     66.50,   66.50,   66.50,   66.50,   66.50,   66.50,   66.50,  350.00,  350.00,  375.00
<500,  25.20,   32.10,   37.50,   45.45,   55.70,   62.65,   74.50,  190.85,  190.85,  225.45
<1000, 23.45,   29.90,   35.00,   42.45,   52.05,   58.40,   69.50,  177.25,  177.25,  208.70
9999999, 24.05, 30.50,   35.70,   43.30,   53.05,   59.55,   70.90,  180.40,  180.40,  212.95

// Rate Chart Number: 000185
[Chart("GND_CWT_8")]
[EffectiveDate("1/2/2006")]
[Header("ZONE")]
[Prefix("WEIGHT")]
          2,       3,       4,       5,       6,       7,       8,       9,      10,      11
0,     66.50,   66.50,   66.50,   66.50,   66.50,   66.50,   66.50,  350.00,  350.00,  375.00
<500,  25.20,   32.10,   37.50,   45.45,   55.70,   62.65,   74.50,  190.85,  190.85,  225.45
<1000, 23.45,   29.90,   35.00,   42.45,   52.05,   58.40,   69.50,  177.25,  177.25,  208.70
9999999, 24.05, 30.50,   35.70,   43.30,   53.05,   59.55,   70.90,  180.40,  180.40,  212.95
```

FIG. 7E
(Rate Source Files)

COMPILED DATA FOR SOFTWARE APPLICATIONS

CROSS-REFERENCE TO RELATED APPLICATIONS

This application claims the benefit of U.S. Provisional Application Ser. No. 60/819,223, filed Jul. 7, 2006, the contents of which are incorporated herein by reference in their entirety.

BACKGROUND OF THE INVENTION

Description of Related Art

Carriers are organizations that provide services to transport persons or goods to the general public. In conjunction with carriers, many organizations using carrier services utilize carrier management systems, which are generally network-delivered, multi-carrier shipping management systems that allow rate/service comparisons of various carriers, generate mailing/shipping labels, and collect and arrange data. Generally, a typical shipping location will have one or more user terminals that access a carrier management system data center over a network. Typically such organizations and users of carrier management systems may include, for instance, corporations or business entities having shipping departments and retail shipping facilities such as Mail Boxes Etc./The UPS Store, Kinko's, and Staples.

Presently, carrier management systems allow users to integrate shipping processes into existing enterprise systems and centrally manage the shipping of parcels through one or more carriers. Specifically, carrier management systems can assist the user in choosing a carrier based on cost or other characteristics. Many times in providing such assistance, carrier management systems will utilize data specific to each carrier such as zone data, rating data, and other carrier information, and in many instances, this information may need to be updated on a frequent basis. For example, a carrier may increase their shipping rates on overnight express parcels. Therefore, the carrier will want these new rates reflected in the carrier management systems used by customers of the carrier.

In some carrier management system applications, such information is generally maintained at a central carrier management system data center to facilitate updates/changes to the information and minimize duplication. However, a drawback to such a system is that if the data center is unavailable, e.g., the data center is down for maintenance or a network failure occurs and prohibits communication between the data center and the user, the user will be unable to use their carrier management system during this time. In addition, many such carrier management system applications may suffer in performance because the applications are querying the needed information over a network from the data center and, in many cases, from a database.

Simply querying a database can be detrimental to performance, e.g., a carrier management system application querying a database in order to obtain rating data to determine the cost of shipping a parcel can result in a considerable amount of additional process time. This is because querying the database typically involves the application requesting the rating data from the database management system (DBMS) of the database, the DBMS actually querying the requested data from the database, and the DBMS returning the data to the application. In many cases, the process time is dependent on such factors as how well the query is formulated, how the database, itself, is structured, and the size of the database. Often, the greatest efficiency is obtained if the data is embedded in the application's code rather than having the data completely separate in a database. However, many times this is not practical because every time there is a change to the data, the code of the application will often also need to be changed.

Another option for updating the information is to download zone, rating and other information to client systems to reduce network latency and to provide the ability to continue operations in the event of network failure. Such a system is disclosed in U.S. Pat. No. 6,718,350 to Karbowski, in which a data center determines that the data files stored within a client system are not the most current and facilitates an "update" of the data files. Specifically, the data center polls the client system to determine whether an update is necessary. The system then parses the files into segment files and compares similarly parsed existing files on the client system to determine which component files have changed, and therefore, need updating. As a result, the data center then transfers the files that include the changes to the client system.

The Karbowski patent provides for a mechanism for updating the information on a client system and thus updating the information in the carrier management system application. In addition, the Karbowski patent provides the updates with minimal effect and at a minimal cost because only the files in need of updating are transferred to the client system. However, a drawback to such a system is that the files transferred can be easily doctored or corrupted. For example, the updated file may be intercepted during the transfer by a third-party and the rates may be doctored to reflect incorrect amounts. In addition, the files can be easily doctored by the end user. Therefore, a need still exists to ensure security of the data.

Therefore, a challenge faced by present carrier management systems is the upgrade or change of needed information, such as zone data, rating data, and other carrier specific information, without substantially or inadvertently affecting the performance of the system. In addition, another challenge is to provide a mechanism by which the raw data is not overtly exposed to end users of the software and third-parties, and to, in turn, provide a certain level of security by preventing the end users and third-parties from having the ability to change the data.

BRIEF SUMMARY OF THE INVENTION

Various embodiments of the present invention provide systems and methods for converting rate and zone tables used for shipment rate calculations into executable code. Compiling this information into executable code may, for example, improve look-up performance, provide encapsulation of logic related to the specific nature of the data, and provide a mechanism by which the raw data is not overtly exposed to end users of the software and third-parties. In this regard, compiling the information may provide a certain level of security by preventing the end users and third-parties from having the ability to readily change the data.

In particular, various embodiments provide a system for converting data used for shipment rate calculations into executable code comprising of one or more applications, wherein the applications are configured to perform the steps of: (a) scanning the data from at least one source file; (b) parsing the data in accordance with a template; and (c) generating the executable code, utilizing the parsed data. Further, in various embodiments, the executable code is executable without accessing the source file to receive one or more parameters related to a shipment and to provide the data for the shipment.

In various embodiments, the source file may comprise at least one attribute block that includes data definitions attributes. In addition, in various embodiments, the data may comprise at least one line of delimited values as defined by the attribute block.

In certain embodiments, the data may comprise at least one delivery zone chart. Specifically, in one embodiment, the data may comprise at least one delivery zone chart and the attribute blocks comprise a chart name, an indicator of whether the data is domestic or international and origin country of the shipment, a service for the data, a layout of the data, an origin postal codes that the data applies to, and/or an effective date for the data.

While in certain other embodiments, the data may comprise at least one rate chart. Specifically, in one embodiment, the data may comprise at least one rate chart and the attribute blocks comprise a chart name, an effective date for the data, a header information, and/or a prefix information.

In various embodiments, the template describes descriptors, types, and formats of elements contained within the source file. In certain embodiments, the template is embodied within the source file.

In addition, various embodiments provide a system for retrieving data used for shipment rate calculations comprising one or more applications, wherein the applications are configured to perform the steps of calling executable code. In various embodiments, the executable code is generated by scanning data from at least one source file and parsing the data in accordance with a template. Further, in various embodiments, the executable code is executable without accessing the source file to receive one or more parameters related to a shipment and provide the data for the shipment.

Additionally, various embodiments provide a method for converting data used for shipment rate calculations into executable code comprising: (a) scanning the data from at least one source file; (b) parsing the data in accordance with a template; and (c) generating the executable code utilizing the parsed data. Further, in various embodiments, the executable code is executable without accessing the source file to receive one or more parameters related to a shipment and to provide the data for the shipment.

Specifically, in various embodiments, the data comprises at least one delivery zone chart and attribute blocks comprise a chart name, an indicator of whether the data is domestic or international and origin country of the shipment, a service for the data, a layout of the data, one or more origin postal codes that the data applies to, and an effective date for the data. In certain other embodiments, the data comprises at least one rate chart and the attribute blocks comprise a chart name, an effective date for the data, header information, and/or prefix information. Yet, in other embodiments, the template describes descriptors, types, and formats of elements contained within the source file.

Furthermore, various embodiments provide a method for retrieving data used for shipment rate calculations comprising the steps of calling an executable code. Specifically, in various embodiments, the executable code is generated by scanning data from at least one source file and parsing the data in accordance with a template. More specifically, in various embodiments, the executable code is executable without accessing the source file to receive one or more parameters related to a shipment and provide the data for the shipment.

In addition, various embodiments provide a method for securing data used in a transaction, comprising: (a) scanning the data from at least one source file; (b) parsing the data in accordance with a template; and (c) generating executable code utilizing the parsed data. Further, in various embodiments, the executable code is executable without accessing the source file to receive one or more parameters related to a transaction, and to provide an output required to complete the transaction.

Lastly, various embodiments provide a method for securing data provided to a user, comprising: (a) scanning the data from at least one source file; (b) parsing the data in accordance with a template; and (c) generating executable code utilizing the parsed data. Further, in various embodiments, the executable code is executable without accessing the source file to receive one or more parameters related to a transaction, and to provide the data to a user.

BRIEF DESCRIPTION OF THE SEVERAL VIEWS OF THE DRAWINGS

Figure 1:
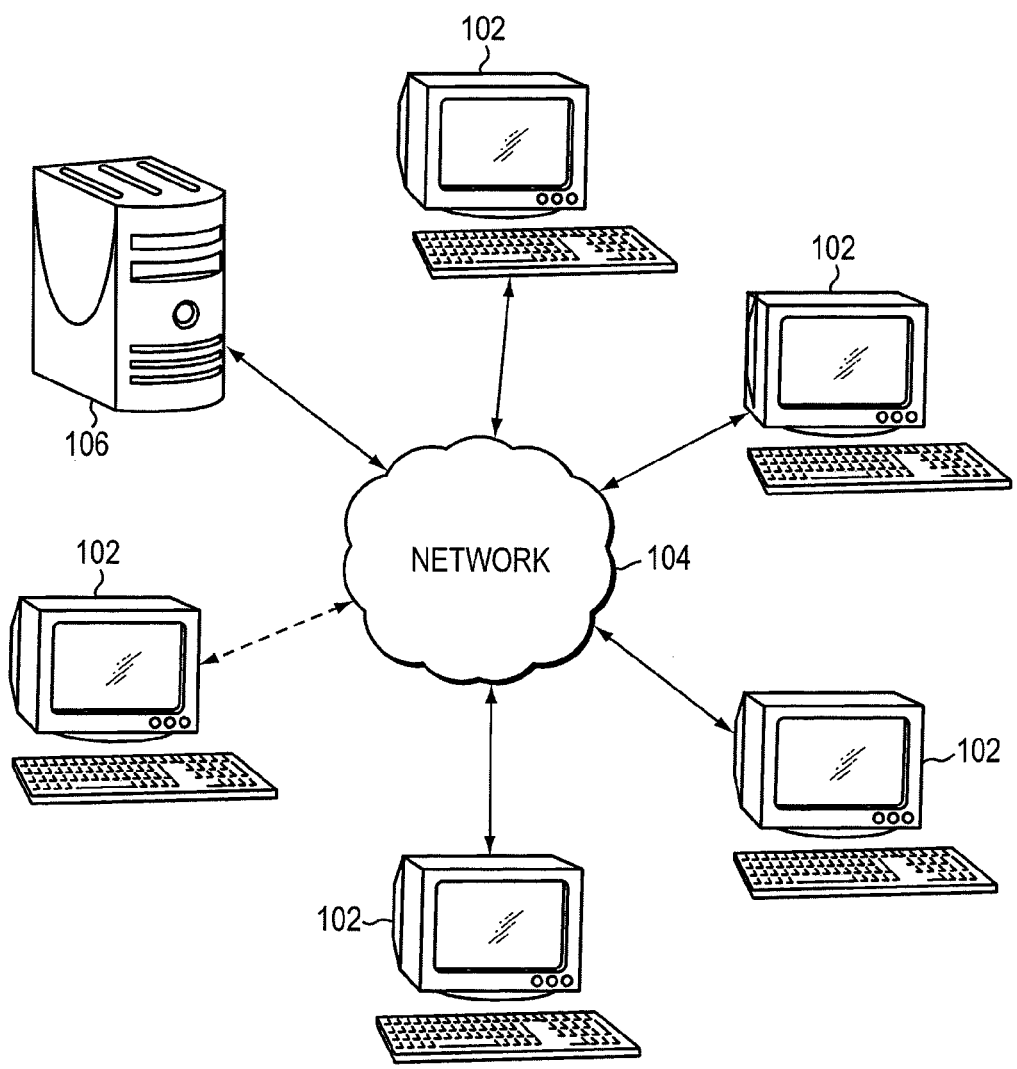
Figure 2:
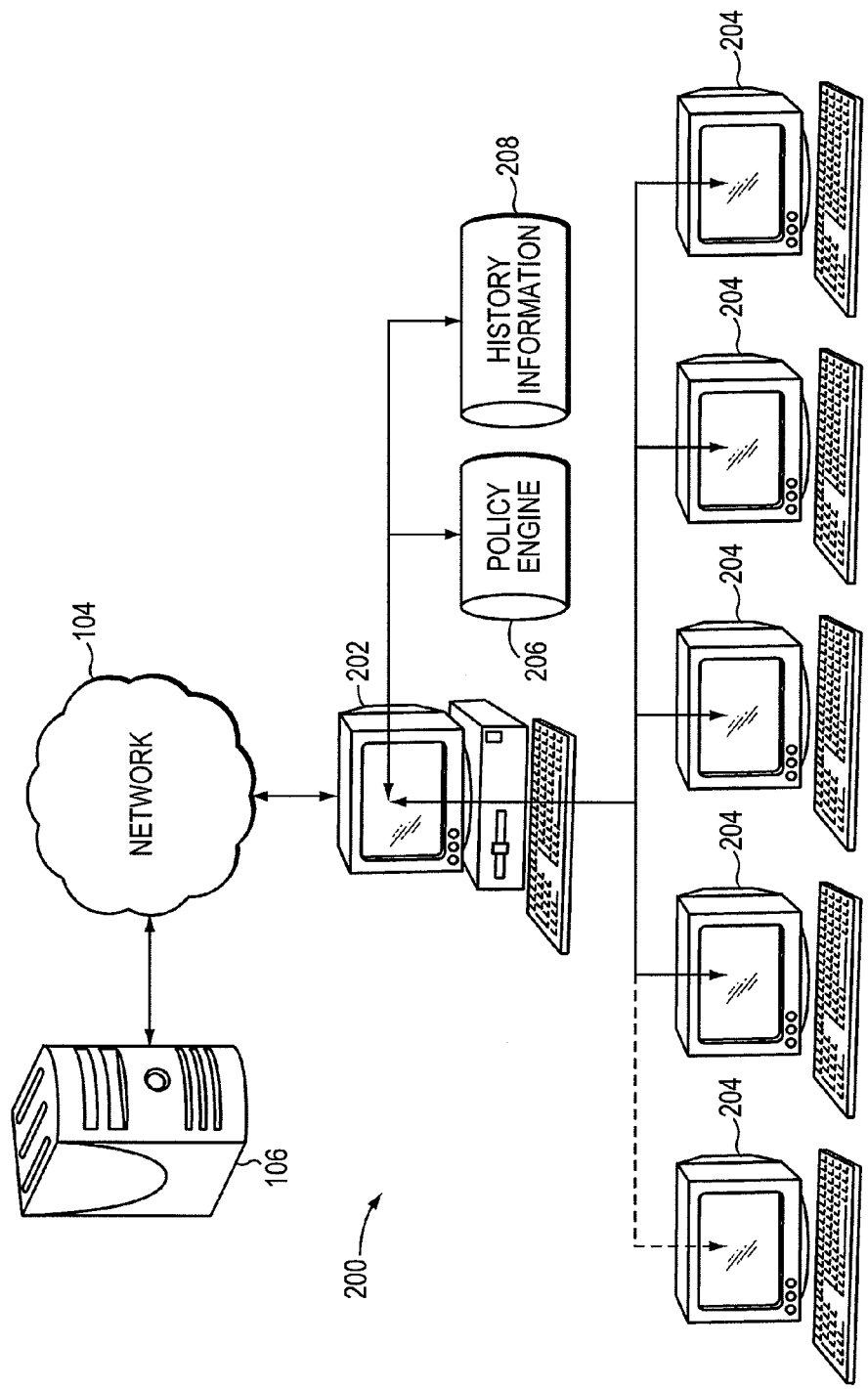
Figure 3A:
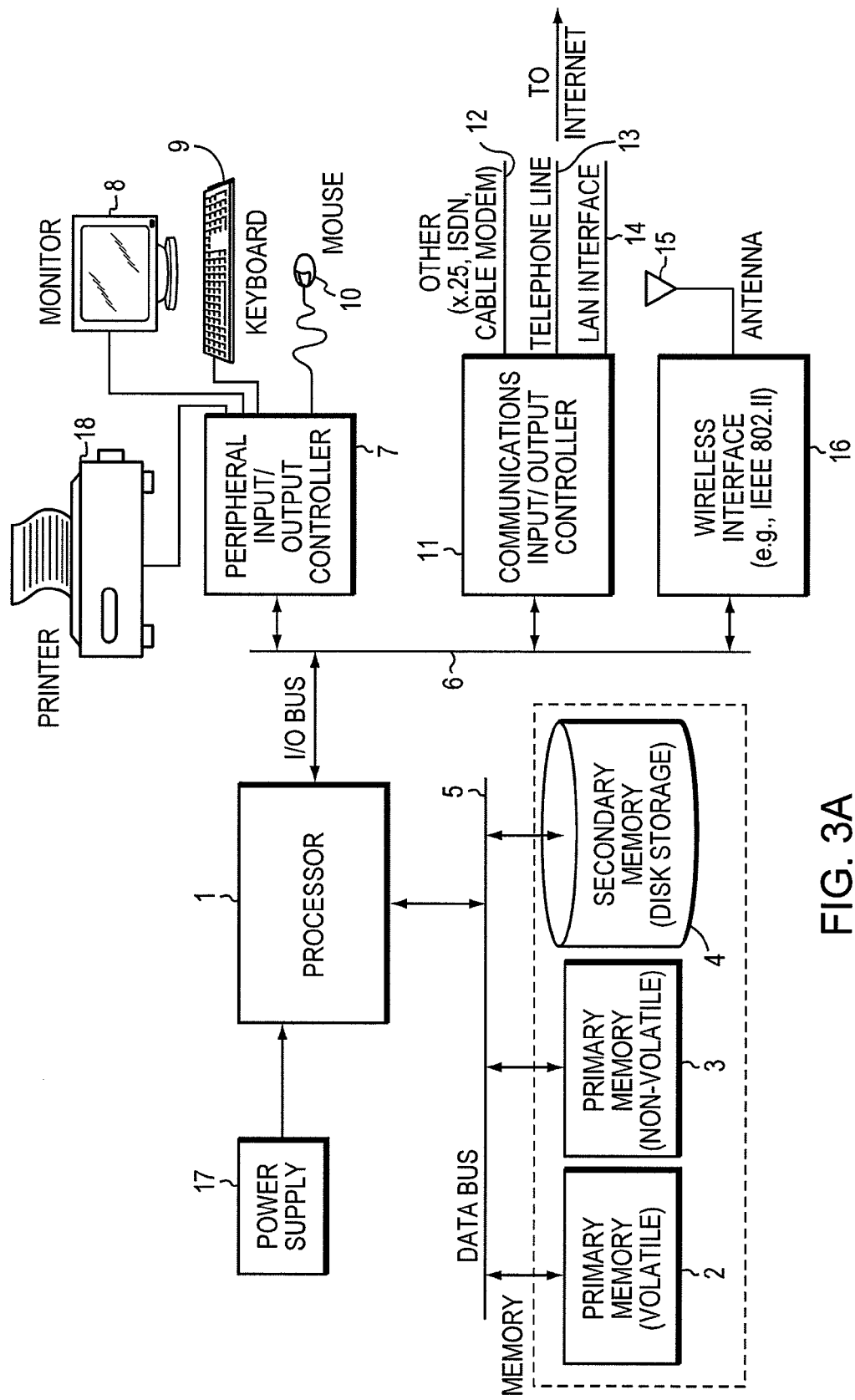
Figure 3B:
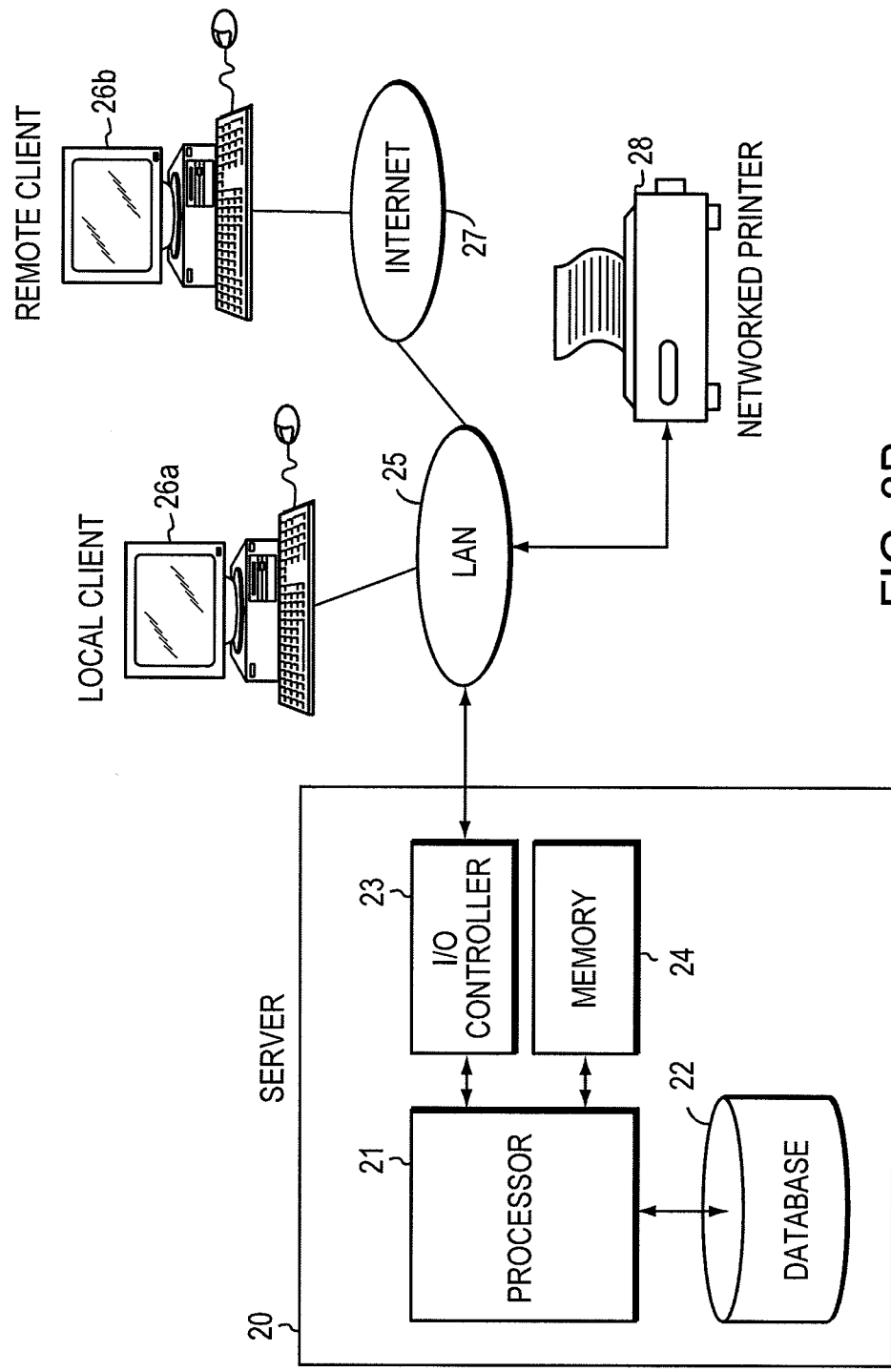
Figure 4:
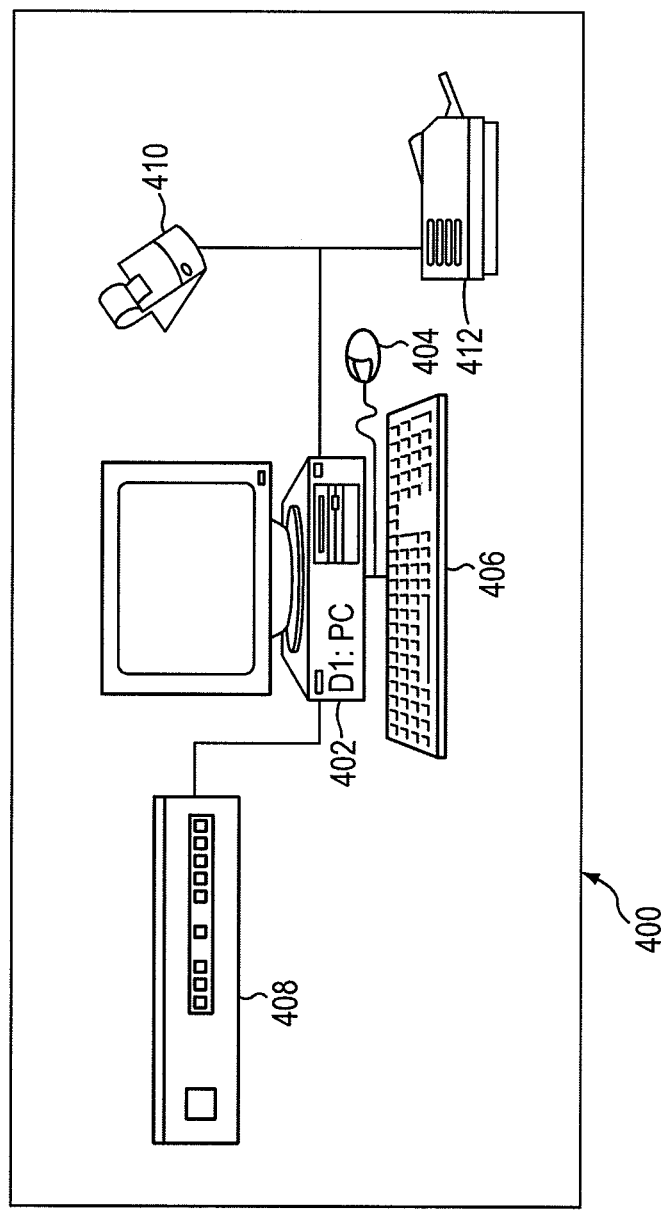
Figure 5:
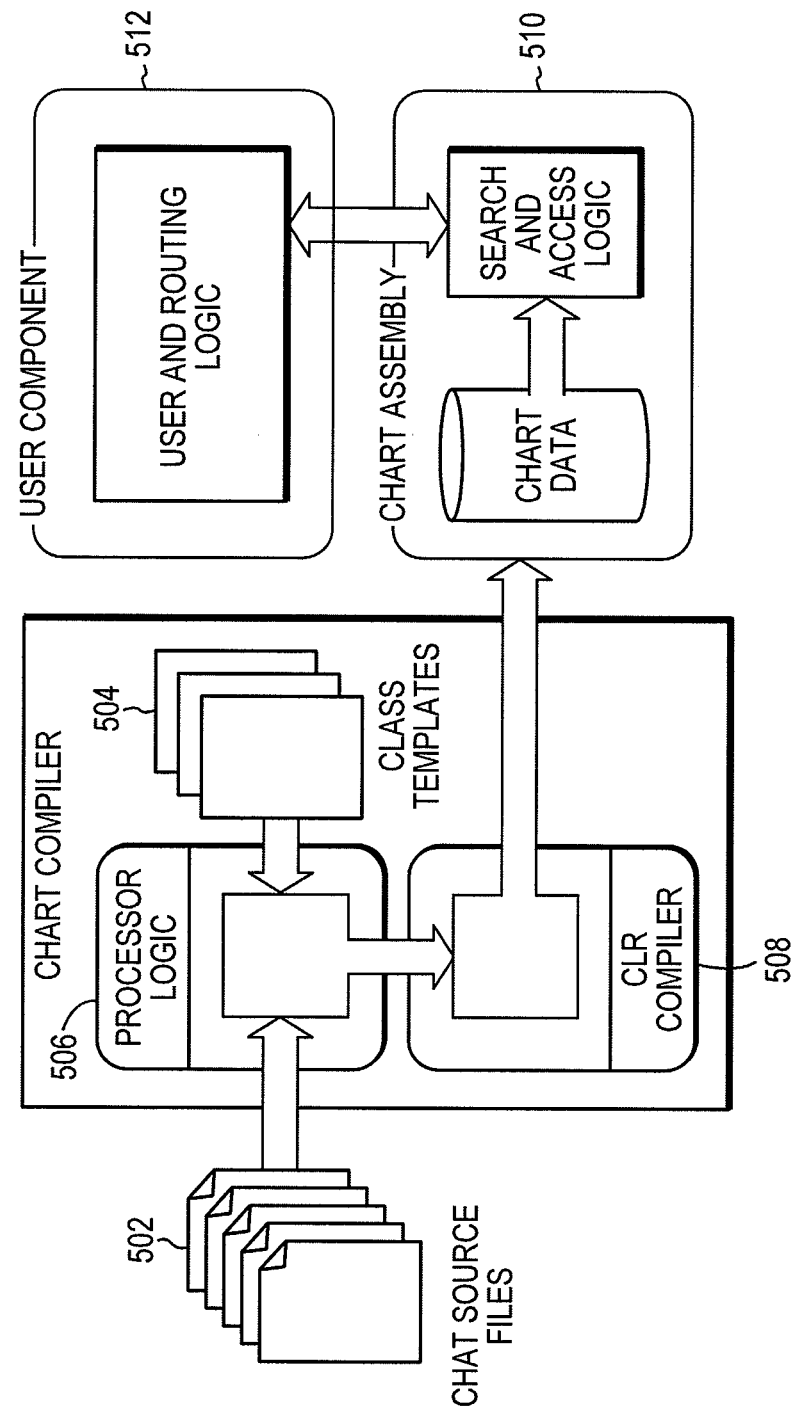
Figure 8:
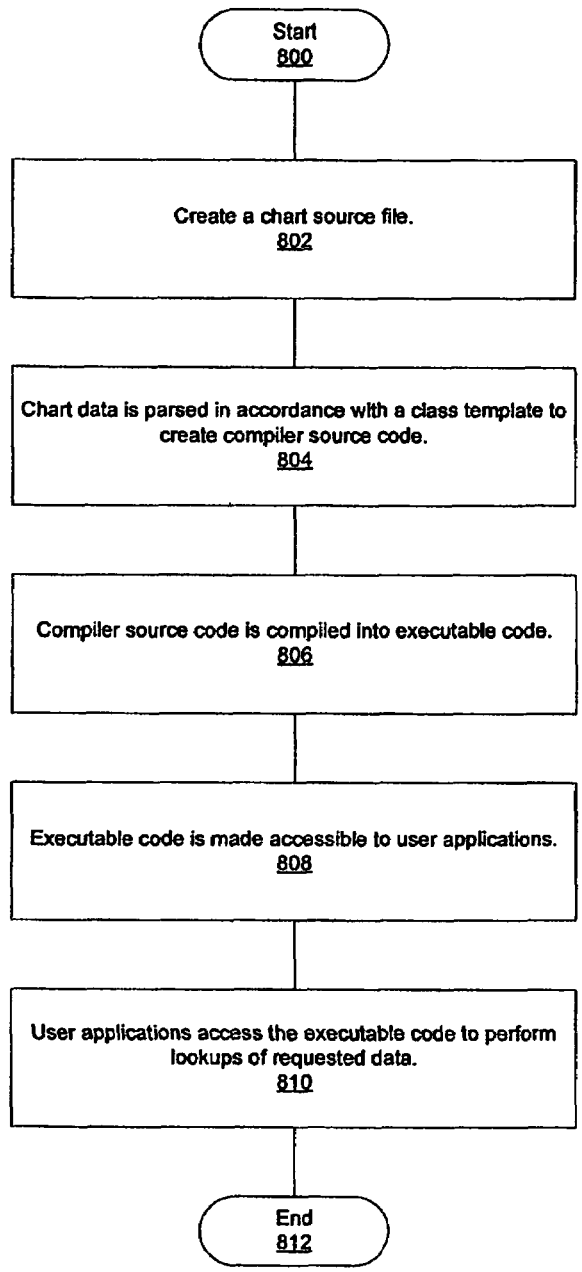

Having thus described the invention in general terms, reference will now be made to the accompanying drawings, which are not necessarily drawn to scale, and wherein:

FIG. 1 is an exemplary system for implementation of a computerized system such as, for example, a carrier management system comprised of one or more user terminals or shipping stations (which are examples of "client computers" or "clients") that are connected over a network to one or more servers that function as a data center, and that may be used to practice one or more aspects of the invention;

FIG. 2 is an exemplary shipping location computer system that is comprised of one or more user terminals and an administrator's terminal that are connected to a data center over a network that may be used to practice one or more aspects of the present invention;

FIG. 3a is an illustration of one embodiment of a computer that can be used to practice aspects of the present invention;

FIG. 3b is an embodiment of a processing system having a distributed communication and processing architecture that may be used to practice aspects of the present invention;

FIG. 4 is an illustration of a typical user terminal that may be used in one or more embodiments of the present invention;

FIG. 5 is an illustration of one embodiment of a system according to a particular embodiment of the present invention;

FIG. 6 is an exemplary zone source file that may be used to practice one or more embodiments of the present invention;

FIGS. 7A-7E are exemplary rate source files that may be used to practice one or more embodiments of the present invention; and FIG. 8 is a flowchart of a process for creating an executable rate or zone chart that may be accessed by other applications (such as, for example, a carrier management system), in various embodiments of the invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers, if referenced herein, refer to like elements throughout.

Various embodiments of the present invention are described below with reference to block diagrams and flowchart illustrations of methods, apparatuses (e.g., systems) and computer program products according to various embodiments of the invention. It should be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions that execute on the computer or other programmable data processing apparatus create an approach for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction mechanism that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of arrangements for performing the specified functions, combinations of steps for performing the specified functions and program software for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Various entities provide carrier management systems for shipping parcels. As mentioned, carrier management systems are generally network-delivered, multi-carrier shipping management systems that may, for example, (1) allow rate/service comparisons of various carriers, (2) generate mailing/shipping labels, and (3) collect and arrange data. Although there are several different configurations and operating mechanisms for these systems, a basic configuration is shown in FIG. 1, which generally incorporates of one or more user terminals 102 or shipping terminals (generally clients) that are connected over a network (e.g., the Internet or a local network) 104 to one or more servers that function as a data center 106. Generally, a user terminal 102 utilizes browser-based software to access the data center 106 over the Internet. In one embodiment, the data center 106 contains rating and/or shipping information for one or more carriers, though in other embodiments, rating, zone, and other shipping data is maintained on the clients. However, software other than browsers and networks other than the Internet may be used in various embodiments. Furthermore, various embodiments are applicable to information that is maintained at the data center 106 as well as data maintained at a client location or on user terminals 102.

In various embodiments, a user at a user terminal 102 may enter certain information about a parcel to be shipped such as, for example, the parcel's weight, dimensions, destination, shipper, desired class of service (ground, overnight air, etc.), etc. Furthermore, certain business rules of the entity operating or controlling the user terminal 102 may be applied to how the information is entered. Information may be entered into the user terminal 102 in a multitude of ways such as, for example, by the use of scales, scanners, keyboards, etc. In one embodiment, once some amount of information has been received by the user terminal 102, the user terminal 102 will access the data center 106 over the network 104 for rating information and shipping information for various carriers that are participating in the carrier management system. In other instances, rating and shipping information is maintained at the client location on one or more user terminals or servers. This rating and shipping information may then be presented to a shipper and the shipper may decide which carrier to use based on the presented information. In this manner, the shipper may be presented with various carrier options for shipping the parcel and may choose the one that best meets the shipper's needs and/or budget.

The above-described architecture may be used in a number of computer hardware and software configurations, not just with carrier management systems. However, the carrier management system configuration will be utilized throughout this application for exemplary purposes and not for purposes of limitation.

A shipping location 200 may be comprised of one or more computer terminals. For instance, a shipping location as shown in FIG. 2 may be comprised of an administrator's computer or terminal 202 and one or more shipping computers or terminals 204. While the administrator terminal 202 and the shipping terminals 204 may used for conducting shipping business, the administrator terminal 202 manages shipping activities across the shipping location (a/k/a enterprise) 200. For instance, the administrator terminal 202 may include, in some embodiments, a policy engine 206 that can specify business rules and procedures for all shipping terminals 204 associated with the enterprise 200. In various embodiments, in the process of entering shipping information and printing labels, the policy engine 206 can automatically create compliance with key policies and track compliance with the enterprise's 200 business rules. The administrator terminal 202 may also be used to collect a history of the enterprise's 200 shipping transactions. This history information 208 may be used to create a number of shipping reports, including shipping activity by location, shipping activity by carrier, shipping activity by department, shipping activity by cost center, etc. Furthermore, the administrator terminal 202 may be used to store and maintain data for the shipping terminals 204 in various embodiments of the present invention. For instance, in one embodiment, the administrator terminal 202 stores rate and zone table information that is accessed by the shipping terminals 204, and the administrator terminal 202, at that shipping location 200. In other embodiments, rate and zone table information is stored at the data center 106, and in yet another embodiment, rate and zone table information is stored on each shipping terminal 204.

Various carrier management systems have been patented or have patent applications pending. For instance, U.S. Pat. No. 5,631,827; issued to Nicholls et al. on May 20, 1997 and U.S. Pat. No. 5,485,369 issued to Nicholls et al. on Jan. 16, 1996; both fully incorporated herein and made a part hereof, describe one such carrier management system. Another such carrier management system is described in U.S. patent application Ser. No. 09/684,869; filed on Oct. 6, 2000; and U.S. patent application Ser. No. 09/684,865; also filed on Oct. 6, 2000; and U.S. patent application Ser. No. 09/820,377; filed on Mar. 27, 2001 and published as United States Patent Application Publication No. 20020032573 on Mar. 14, 2002; each fully incorporated herein and made a part hereof.

In several of the embodiments of the invention referenced herein, a "computer," terminal, or user station is referenced. The computer, terminal, or user station may be, for example, a mainframe, desktop, notebook or laptop, hand-held, hand held device such as a data acquisition and storage device, etc. In some instances, the computer may be a "dumb" terminal used to access data or processors over a network. Turning to FIG. 3a, one embodiment of a computer is illustrated that can be used to practice aspects of the present invention. In FIG. 3a, a processor 1, such as a microprocessor, is used to execute software instructions for carrying out the defined steps. The processor 1 receives power from a power supply 17 that also provides power to the other components as necessary. The processor 1 communicates using a data bus 5 that is typically 16 or 32 bits wide (e.g., in parallel). The data bus 5 is used to convey data and program instructions, typically, between the processor and memory. In various embodiments, memory can be considered primary memory 2 that is RAM or other forms which retain the contents only during operation, or it may be non-volatile 3, such as ROM, EPROM, EEPROM, FLASH, or other types of memory that retain the memory contents at all times. The memory may also be secondary memory 4, such as disk storage, that stores large amounts of data. In some embodiments, the disk storage may communicate with the processor using an I/O bus 6 instead, or a dedicated bus (not shown). The secondary memory may be a floppy disk, hard disk, compact disk, DVD, flash, or any other type of mass storage known to those skilled in the computer arts.

The processor 1 also communicates with various peripherals and/or other external devices using an I/O bus 6. In various embodiments, a peripheral I/O controller 7 is used to provide standard interfaces, such as RS-232, RS422, DIN, USB, or other interfaces as appropriate to interface various input/output devices. Typical input/output devices include local printers 18, a monitor 8, a keyboard 9, and a mouse 10 or other typical pointing devices (e.g., rollerball, trackpad, joystick, etc.).

The processor 1 typically also communicates using a communications I/O controller 11 with external communication networks, and may use a variety of interfaces such as data communication oriented protocols 12 such as X.25, ISDN, DSL, cable modems, etc. The communications controller 11 may also incorporate a modem (not shown) for interfacing and communicating with a standard telephone line 13. Finally, the communications I/O controller may incorporate an Ethernet interface 14 for communicating over a LAN. Any of these interfaces may be used to access the Internet, intranets, LANs, or other data communication facilities.

Finally, the processor 1 may communicate with a wireless interface 16 that is operatively connected to an antenna 15 for communicating wirelessly with another devices, using for example, one of the IEEE 802.11 protocols, 802.15.4 protocol, or a standard 3G wireless telecommunications protocols, such as CDMA2000 1x EV-DO, GPRS, W-CDMA, or other protocol.

An alternative embodiment of a processing system that may be used is shown in FIG. 3b. In this embodiment, a distributed communication and processing architecture is shown involving a server 20 communicating with either a local client computer 26a or a remote client computer 26b. The server 20 typically comprises a processor 21 that communicates with a database 22, which can be viewed as a form of secondary memory, as well as primary memory 24. The processor also communicates with external devices using an I/O controller 23 that typically interfaces with a LAN 25. The LAN may provide local connectivity to a networked printer 28 and the local client computer 26a. These may be located in the same facility as the server, though not necessarily in the same room. Communication with remote devices typically is accomplished by routing data from the LAN 25 over a communications facility to the Internet 27. A remote client computer 26b may execute a web browser, so that the remote client 26b may interact with the server as required by transmitted data through the Internet 27, over the LAN 25, and to the server 20.

Those skilled in the art of data networking will realize that many other alternatives and architectures are possible and can be used to practice the principles of the present invention. The embodiments illustrated in FIGS. 3a and 3b can be modified in different ways and be within the scope of the present invention as claimed.

A typical user terminal that may be used in one or more embodiments of the present invention is shown in FIG. 4. The embodiment of a user terminal 400 of FIG. 4 is comprised of a personal computer 402 having a mouse 404 and a keyboard 406. Also included in this particular embodiment is a scale 408 for weighing parcels and a barcode label printer 410 for printing mailing/shipping labels. This user terminal 400 also includes a report printer 412, though the report printer 412 is not required to practice the invention.

Various embodiments of the present invention comprise a method and a system for converting rate and zone tables used for shipment rate calculations into executable code. This approach may, for example: (1) improve lookup performance, (2) provide encapsulation of logic related to the specific nature of the data, and (3) provide a mechanism by which the raw data is not overtly exposed to end users of the software and third-parties. It may also provide a certain level of security by preventing end users and third-parties from having the ability to change the data.

In one embodiment according to the present invention, a user may have a parcel she wishes to ship for next day delivery and may wish to determine the rate for shipping the parcel. A source code compiler (as are known by those of ordinary skill in the art) compiles zone source files into, for example, a .NET assembly (as are known by those of ordinary skill in the art), which contains zone data along with code to perform lookups. In order to determine the delivery zone for the parcel, the user may then utilize these assemblies to perform lookups on the proper chart based on, for example: (1) the shipping origin of the parcel (country and postal district), (2) whether the service (in this case, next day delivery) is domestic or international, and (3) the type of service. Within a chart, lookups may be performed for zones based on a combination of the destination country, range, and city. The above-described charts and zone lookups are exemplary by nature and various other criteria may be used to establish charts, look charts up, and locate information within a selected chart. Various embodiments provide a system and method to manage a cache of charts that contain compiled, executable information that expedites the process of information retrieval.

Continuing with the example from above, the user now has the shipping zone for the parcel and may wish to further determine the shipping rate for the parcel. A source code compiler (as are known by those of ordinary skill in the art) compiles rate source files into, for example, a NET assembly (as are known by those of ordinary skill in the art), which contains rate data along with code to perform lookups. The user may then utilize these assemblies to perform lookups for the proper chart based on a given chart name. Further, the user may perform lookups of rate data to determine the rate for the parcel within a rate chart based on, for example: (1) zone, (2) zone and/or weight of the shipment, (3) and key name. The above-described charts and rate data lookups are exemplary by nature and various other criteria may be used to establish charts, look charts up, and locate information within a selected chart. Various embodiments of the present invention provide a system and method to manage a cache of rate charts that contain compiled, executable information that expedites the process of information retrieval.

As shown in FIG. 5, one embodiment of a system according to the present invention is comprised of elements including: (1) chart source files 502; (2) class templates 504; (3) processor logic 506; (4) a compiler 508 such as, for example, the common language runtime (CLR) compiler as available from Microsoft Corporation of Redmond, Wash.; (5) chart assemblies 510; and (6) user components 512.

In various embodiments, the chart source files 502 contain source data for rate charts and zone charts and may contain one or more chart definitions. The class templates 504 describe the descriptors, types, and formats of the elements contained within the chart source files 502. In addition, the class templates 504 may be embodied within the chart source files 502. The processor logic 506 is used to scan the input data, parse it in accordance with the appropriate class template 504, and generate rate/zone compiler source code that implements the lookup functions for the data in question. The compiler 508 (which may be, for example, a CLR compiler) compiles the generated source code into executable code. Chart assemblies 510 are the executable code generated by the CLR compiler 508 when the CLR compiler 508 compiles source code files generated by the rate/zone compiler of the processor logic 506. The user components 512 call the chart assemblies to request lookups of rate and zone data.

In various embodiments, the chart source files 502 may be zone source files or rate source files. An exemplary zone source file may contain one or more chart definitions. In one embodiment of a zone source file, charts are defined by attribute blocks within bracketed (e.g., "[ ]") delimiters. However, other types of delimiters may be used in various embodiments, such as commas or semi-colons. Zone data follows the attribute block within a zone source file. An exemplary zone source file may include attribute blocks that define chart attributes such as: (1) chart name, (2) whether the chart is domestic or international and the origin country of a shipment, (3) the service for the chart, (4) the layout of the chart data, (5) the origin postal codes that the chart applies to, and (6) the effective date (range) for a chart. For example in one embodiment, the exemplary definition fields chart attribute blocks are shown in Table I, below:

TABLE I

[Chart("name")]
[Domestic("country") or International("country")]
[Service("serviceid")]
[Layout("layoutspec")]
[OriginPostal("postalcodes")]
[EffectiveDate("dates")]

The exemplary attribute blocks (using the exemplary definition fields of Table I), are shown in Table II, below:

TABLE II

[Chart("ZONE_573")]
[Domestic("UNITED_STATES")]
[Service("ALL")]
[Layout("PZ")]
[OriginPostal("57301-57399")]
[EffectiveDate("1/2/2006")]

In various embodiments, the definition field [Chart("name")] names the zone chart. In the preferred embodiment, it is generally required that the name be unique within a compiled assembly of zone charts. In various embodiments, the definition field [Domestic("country") or International ("country")] indicates whether the zone chart is domestic or international and specifies the origin country for a shipment. In particular embodiments, the definition field [Service("serviceid")] identifies the service for the chart used in lookups. For instance, there may be service IDs for next-day delivery, two-day delivery, ground, etc. and other services provided by a carrier. However, the field does not necessarily have to be an actual service ID.

In various embodiments, the definition field [Layout("layoutspec")] describes the layout of the chart data using, for example, layoutspec codes. For instance in one embodiment, the code "N" is used for destination country; the code "P" is used for destination postal code range; the code "C" is used for destination city, and the code "Z" is used for zone data. Therefore, an exemplary layout definition field of [Layout ("PZ")] would have zone chart data comprised of a range of destination postal codes and a zone reference on a single line and delimited by commas (e.g., 55000, 55599, 3). In various embodiments, the definition field [OriginPostal("postalcodes")] specifies the origin postal cards that the chart applies to. For example, in one embodiment, the postal codes may be specified as a comma-separated list of ranges such as 74135-74-144, 74150, 74155-74167, while in another embodiment, the postal codes may be specified as T1E*-T3B*, T4R*, T5C6Y4-T5C7Z9. Wildcard characters (e.g., "*") are contemplated for use with numeric and alphanumeric postal codes. For instance, a postal range of *, * may be used to match all postal codes in a country, or a single * may be used as the "city" to match all cities within a postal code range. Asterisks (or other wildcard characters) may be used to establish default zones of a chart such that zone lookups never fail to return a value (e.g., *, *, 4).

In various embodiments, the definition field [EffectiveDate ("dates")] associates an effective date, which may be a date range, with a chart. The range may be open-ended by specifying a single start date, or a range may be specified to provide a hard ending date. In the preferred embodiment, when performing a chart lookup, the chart with the most recent starting effective date is chosen by the search and access logic of the chart assembly 510. In addition, in a particular embodiment, in order to save multiple versions of the same chart (with different starting effective date), a date suffix (e.g., _MMYY) may be included in the file name.

As provided above, zone data follows the attribute blocks within a zone source file. In a particular embodiment, zone data is generally comprised of lines of comma-delimited values as defined by the [Layout("layoutspec")] value of the attribute block. However, it is contemplated within the scope of this invention that other forms of delimitation may be employed, such as tabs, spaces, paragraphs, etc. For example, in one embodiment, a definition field of [Layout("PZ")] would have exemplary comma-delimited data such as follows:

56100, 56199, 2
56200, 56699, 3
56700, 56799, 4

In the example above, the first two numbers are a range of postal codes and the last number is a zone reference assigned to shipments that originate in the postal codes defined in the [OriginPostal("postalcodes")] definition field and are shipped to a postal code found in the range of postal codes.

In another exemplary of an embodiment, a definition field of [Layout("CPZ")] would have exemplary comma-delimited data such as follows:

SPAIN, 01000, 34999, 4
SPAIN, 36000, 37999, 4

In the above example, the destination country is identified in the record, the next two numbers indicate a range of postal codes (with the first number indicating the beginning zip code in the range of zip codes, and the second number indicating the ending zip code in the range of zip codes), and the last number is a zone reference assigned to shipments that originate in the postal codes defined in the [OriginPostal("postalcodes")] definition field and are shipped to the country and a postal code found in the range of postal codes. Comments may, in various embodiments, be included in a zone source file by inserting the comments after an identifier such as, for example, "//" in the file, though other forms of comment identification are contemplated within the scope of various embodiments. An exemplary zone source file is shown in FIG. 6.

A zone source file, once created, may be compiled into a zone assembly, e.g., executable code. For instance, in one embodiment, the zone source file is compiled into a zone assembly using a CLR compiler and the command, ZoneCompiler zone_assembly assembly version chart_files. Zone_assembly is the name to be given to the output assembly name. Assembly_version is a version number assigned to the zone assembly. Chart_files is the name (or wildcard specification) of the zone source files.

Once compiled, a user component 512 may search for and retrieve zone charts through software call commands such as, in one embodiment, GetDomesticChart(identifying criteria) or GetInternationalChart(identifying criteria). The identifying criteria may include origin country and type of service. Such a lookup call command may return a chart instance or a null, if no chart is found. Further, once a zone chart is found, the zone information may be retrieved using a software call command such as, for example, GetZone(identifying criteria). In this case, the identifying criteria may include a destination country, range, and city. In addition, in other embodiments, other chart attributes may also be retrieved (e.g., name, effective dates, service, etc.).

An exemplary rate source file may also contain one or more chart definitions. In one embodiment, similar to the zone source file described above, rate charts may be defined by attribute blocks within bracketed (e.g., "[ ]") delimiters. However, other types of delimiters may be used in various embodiments, such as commas or semi-colons. In various embodiments, a rate source file is compiled into an assembly that contains rate data. Rate data follows the attribute block within a rate source file. An exemplary rate source file may include attribute blocks as chart definitions such as chart name, effective date information, header information, and prefix information. For example exemplary definition fields chart attribute blocks of a particular embodiment are shown in Table III, below:

TABLE III

[Chart("name")]
[Header("type")]
[Prefix("data")]
[EffectiveDate("dates")]

The exemplary attribute blocks (using the exemplary definition fields of Table III), are shown in Table IV, below:

TABLE IV

[Chart("WEXP_PR")]
[Header("ZONE")]
[Prefix("WEIGHT")]
[EffectiveDate("1/2/2006")]

In various embodiments, the definition field [Chart ("name")] names the rate chart. In one embodiment, it is generally required that the name be unique within a compiled assembly of rate charts. The chart name is used to lookup a chart. In various embodiments, the definition field [Header ("type")] defines what the rate chart is based on, such as the delivery zone for a shipment. In a particular embodiment, this is simply defined as "ZONE." In various embodiments, the definition field [Prefix("data")] indicates what type of data is found in the chart. In the case of rate source files, in various embodiments, the definition field [Prefix("WEIGHT')] identifies the chart as a rate chart based on the weight of a shipment to a particular zone. In various embodiments, the definition field [EffectiveDate("dates")] associates an effective date, which may be a date range, with a chart. In one embodiment, the range may be made open-ended by specifying a single start date, or in another embodiment, the range may be specified to provide a fixed ending date. In a particular embodiment, when performing a chart lookup, the chart with the most recent starting effective date is chosen by the search and access logic of the chart assembly 510 (see FIG. 5). In addition, in a particular embodiment, in order to save multiple versions of the same chart (with different starting effective date), a date suffix (e.g., _MMYY) may be included in the file name.

As provided above, in particular embodiments, rate data follows the attribute blocks within a rate source file. In one embodiment, the rate data is generally comprised of lines of comma-delimited values that form a zone/weight based chart. However, various forms of delimitation may be utilized in various embodiments. Further, in a particular embodiment, the first line of the rate data is zone data (e.g., the zone codes as found in the zone chart described above), which begins in the second column. The remaining lines form a matrix that has weight information in the first column and rate information (generally, in U.S. dollars though other currencies are contemplated) that fall in the columns of zones defined in the first line. Therefore, a shipment having a defined weight and being shipped to a particular zone (as determined from the zone chart) can be "rated." Weight data generally defaults to less-than or equal-to (<=) the number found in the first column, though in other embodiments an operator such as the less than (<) operator can be used to specify that the rates in that line are to be applied to shipments that only weigh less than the weight data. Exemplary rate source files are shown in FIGS. 7A-7E.

A rate source file, once created, may be compiled into a rate assembly, e.g., executable code. For instance, in one embodiment, the rate source file is compiled into a rate assembly using a CLR compiler.

Once compiled, a user component 512, in various embodiments, may search for and retrieve rate charts through software call commands such as, for example, GetRateChartZone(identifying criteria), or GetRateChartZoneWeight (identifying criteria), which return at least one instance of a rate chart for a particular zone and at least one instance of a rate chart for a particular zone and weight, respectively. In a particular embodiment, the identifying criteria are the chart name. Once a rate chart is found, the rate information may be retrieved using a software call command such as, for example, GetSingleValue(identifying criteria), GetColumnValue (identifying criteria), and GetValues(identifying criteria). In various embodiments, the identifying criteria may include such variables as zone and weight of shipment.

One advantage to encapsulating shipping data into executable code is that, in various embodiments, it may provide a middle ground between: (1) losing performance due to having to query the data from a source external to the application source code; and (2) having to embed the data within the source code to achieve optimal performance. By providing the data within executable code, the user may be afforded the performance benefit of embedding the data directly within the application source code without actually affecting the source code. As a result, whenever the data needs to be updated or changed, the application source code may, in particular embodiments, not need to be updated or changed.

In addition, a second potential advantage to encapsulating the data into executable code is that it may provide a mechanism by which the raw data is not overtly exposed to end users of the software and third-parties and, in turn, may provide a certain level of security. This is because, in various embodiments, the data is no longer exposed to the end user and third-parties in a format that is easily doctored such as a text or ASCII file.

Exemplary Method of Use

FIG. 8 is a flowchart of an exemplary process for converting data used for shipment rate calculations into executable code. For example, rate or zone charts may be converted into executable code and accessed by other applications, such as a carrier management system, in various embodiments of the invention.

The process begins at Step 800. At step 802, a chart source file is created. In various embodiments, this chart source file may contain delivery zone or rate information, or other information relevant to a carrier. In various embodiments, the data is presented as lines of comma-delimited values as defined by the layout value of the attribute blocks. However, other forms of delimitation may be used in other embodiments. For example, in one embodiment, rate data is encapsulated in a chart source file in which the first line is zone data separated by commas and the remaining lines are weight and rate data separated by commas.

In addition, in various embodiments, the chart source file may also include attribute blocks, as previously mentioned, that include data definition attributes. For example, in various embodiments, the attribute blocks of a zone source file may define (1) chart attributes such as chart name, (2) whether the data is domestic or international and the origin country of a shipment, (3) the service for the data, (4) the layout of the data, (5) the origin postal codes that the data applies to, and/or (6) the effective date (range) for the data. Further, in various embodiments, the attribute blocks of a rate source file may define chart attributes such as chart name, effective date (range) for the data, header information, and prefix information.

In various embodiments, class templates may be used to describe the descriptors, types and formats of the chart data contained within a chart source file. In other words, the class templates may tell the compiler how to parse the data found within the chart source files. In one embodiment, these templates are embodied within the chart source files as one or more attribute blocks, while in another embodiment, the templates are embodied in a different file or as a record in a database.

At step 804, the chart data is scanned and parsed in accordance with the appropriate class template to generate compiler source code that implements the lookup functions for the data in question. At step 806, executable code is generated by compiling the compiler source code into the executable code. In one embodiment, this may be performed by the CLR compiler, as described above, wherein other embodiments other compiler applications, as are well-known in the art, may be used to compile the source code.

At step 808, the executable code is distributed to users or otherwise made accessible to user applications. In various embodiments, the executable code may simply reside at the data center where is it called and accessed by an application via a network connection (e.g., Internet or private network). In certain embodiments, the executable code may be distributed to the user's system and reside locally on a shipping terminal, user terminal, or server. Distribution may be accomplished by various channels. Such as in various embodiments, the executable code may be sent via an application programmable interface (API), e-mail, a web server, or some type of storage medium, such as a CD, flash drive, DVD, or external drive.

At step 810, the data used for shipment rate calculations is retrieved by user components (applications, commands, library calls, etc.) calling and accessing the executable code to perform lookups of requested data. For example, in an embodiment, a user may need to ship a parcel weighing ten pounds via ground from their office in Chicago, Ill., to a customer's office in Atlanta, Ga. The user accesses the data center of the carrier management system where the executable code is stored over the Internet via browser-based software and enters required information such as: (1) the destination address of the parcel; (2) type of desired shipping; and (3) weight of the parcel. This information is then used to formulate commands to call the executable code to retrieve the shipping rate and determine the cost of shipping the parcel. Specifically, the command GetDomesticChart("UNITED_STATES","ALL"), in which "UNITED_STATES" indicates the origin country of the shipment and "ALL" indicates the type of service, is executed to retrieve an instance of a zone chart, such as the zone chart shown in FIG. 6.

Once the instance of the zone chart is returned, the command GetZone("30316"), in which "30316" indicates the ship to zip code, is executed to retrieve the shipping zone for the parcel. In this case, the value 5 is returned. Then, the command GetRateChartZone("GND"), in which "GND" indicates ground shipping, is executed to retrieve an instance of the ground shipping rate chart, such as the rate chart shown in FIG. 7A. Finally, once the instance of the rate chart is returned, a final command GetSingleValue("5","10"), in which "5" indicates the zone and "10" indicates the weight of the parcel, is executed to return the shipping rate, e.g., $6.23. This process can be performed for any number of carriers in order for the user to evaluate and compare the cost of shipping the parcel between several different carriers. In addition, the shipping rate may be determined and retrieved without accessing the original source files used to construct the executable code. Finally, the process ends at step 812.

As previously mentioned, one potential advantage of such a process of converting data used for shipment rate calculations into executable code is the user may be afforded the performance benefit of embedding the data directly within the application source code of without actually affecting the source code, and in addition, the process provides a mechanism by which the raw data is not overtly exposed to end users of the software and third-parties and in turn provides a certain level of security.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended inventive concepts. Although specific terms are employed herein, they are used in a generic and descriptive sense only and not for purposes of limitation.

What I claim is:

1. A system for converting zone and rate data used for shipment rate calculations into executable code, said system comprising:
   at least one computer processor configured to execute one or more applications, wherein said one or more applications, when executed, are configured to perform the steps of:
   a) scanning said zone and rate data from at least one source file comprising source data for at least one rate chart and at least one zone chart;
   b) after scanning said zone and rate data from said at least one source file, parsing said zone and rate data in accordance with at least one template, said at least one template being embodied within said at least one source file; and
   c) utilizing said parsed zone and rate data to generate said executable code, wherein:
      said executable code is executable, without accessing said at least one source file, to: (1) receive one or more parameters related to a shipment, (2) perform a first lookup to identify a shipping zone based on at least one of said one or more parameters, (3) perform a second lookup to identify a shipping rate based on at least said shipping zone, and (4) provide said shipping rate for said shipment.

2. The system of claim 1, wherein said at least one source file comprises at least one attribute block that includes one or more data definition attributes.

3. The system of claim 2, wherein at least one of said zone data or said rate data comprises at least one line of delimited values as defined by said attribute block.

4. The system of claim 1, wherein:
   said at least one source file comprises attribute blocks comprising: (a) a chart name for said at least one zone chart; (b) an indicator of whether said zone data is domestic or international; (c) an origin country of said shipment; (d) a service for said zone data; (d) a layout of said zone data; (e) an origin postal code that said zone data applies to; and (f) an effective date for said zone data.

5. The system of claim 1, wherein:
   said at least one source file comprises attribute blocks comprising a chart name for said at least one rate chart, an effective date for said rate data, header information, and prefix information.

6. The system of claim 1, wherein said at least one template describes descriptors, types, and formats of elements contained within said at least one source file.

7. A system for retrieving zone and rate data used for shipment rate calculations comprising:
   at least one computer processor configured to execute one or more applications, wherein said one or more applications, when executed, are configured to perform the steps of:
   calling an executable code, wherein:
      said executable code is generated by scanning said zone and rate data from at least one source file comprising source data for at least one rate chart and at least one zone chart and parsing said zone and rate data in accordance with at least one template, said at least one template being embodied within said at least one source file; and
      said executable code is executable without accessing said source file to: (1) receive one or more parameters related to a shipment, (2) perform a first lookup to identify a shipping zone based on at least one of said one or more parameters, (3) perform a second lookup to identify a shipping rate based on at least said shipping zone, and (4) provide said shipping rate for said shipment.

8. The system of claim 7, wherein said at least one source file comprises at least one attribute block that includes one or more data definition attributes.

9. The system of claim 8, wherein at least one of said zone data or said rate data comprises at least one line of delimited values as defined by said attribute block.

10. The system of claim 7, wherein:
    said at least one source file comprises attribute blocks comprising: (a) a chart name for said at least one zone chart; (b) an indicator of whether said zone data is domestic or international; (c) an origin country of said shipment; (d) a service for said zone data; (d) a layout of said zone data; (e) an origin postal code that said zone data applies to; and (f) an effective date for said zone data.

11. The system of claim 7, wherein
    said at least one source file comprises attribute blocks comprising a chart name for said at least one rate chart, an effective date for said rate data, header information, and prefix information.

12. The system of claim 7, wherein said at least one template describes descriptors, types, and formats of elements contained within said at least one source file.

13. A computer-implemented method for converting zone and rate data used for shipment rate calculations into executable code comprising:
    a) scanning said zone and rate data from at least one source file comprising source data for at least one rate chart and at least one zone chart;
    b) parsing said zone and rate data in accordance with at least one template by at least one computer processor, said at least one template being embodied within said at least one source file; and
    c) generating said executable code by said at least one computer processor utilizing said parsed zone and rate data, wherein said executable code is executable, without accessing said source file, to: (1) receive one or more parameters related to a shipment, (2) perform a first lookup to identify a shipping zone based on at least one of said one or more parameters, (3) perform a second lookup to identify a shipping rate based on at least said shipping zone, and (4) provide said shipping rate for said shipment.

14. The method of claim 13, wherein:
    said at least one source file comprises attribute blocks comprising: (a) a chart name for said at least one zone chart, (b) an indicator of whether said zone data is domestic or international, (c) an origin country of said shipment, (d) a service for said zone data, (e) a layout of said zone data, (f) an origin postal code that said zone data applies to, and (g) an effective date for said zone data.

15. The method of claim 13, wherein:
said at least one source file comprises attribute blocks comprising a chart name for said at least one rate chart, an effective date for said rate data, header information, and prefix information.

16. The method of claim 13, wherein said at least one template describes descriptors, types, and formats of elements contained within said at least one source file.

17. A method for retrieving a shipping rate comprising the step of:
calling an executable code by at least one computer processor, wherein:
said executable code is generated by scanning zone and rate data from at least one source file comprising source data for at least one rate chart and at least one zone chart and parsing said rate data and said zone data in accordance with at least one template, said at least one template being embodied within said at least one source file; and
said executable code is executable without accessing said source file to: (1) receive one or more parameters related to a shipment, (2) perform a first lookup to identify a shipping zone based on at least one of said one or more parameters, (3) perform a second lookup to identify said shipping rate based on at least said shipping zone, and (4) provide said shipping rate for said shipment.

18. The method of claim 17, wherein:
said at least one source file comprises attribute blocks comprising: (a) a chart name for said at least one zone chart, (b) an indicator of whether said chart data is domestic or international, (c) an origin country of said shipment, (d) a service for said chart data, (e) a layout of said chart data, (f) an origin postal code that said chart data applies to, and (g) an effective date for said chart data.

19. The method of claim 17, wherein:
said at least one source file comprises attribute blocks comprising a chart name for said at least one rate chart, an effective date for said rate data, header information, and prefix information.

20. The method of claim 17, wherein said at least one template describes descriptors, types, and formats of elements contained within said at least one source file.

21. A method for securing zone and rate data used in a transaction, comprising:
a) scanning said zone and rate data from at least one source file comprising source data for at least one zone chart and at least one rate chart;
b) parsing said zone and rate data in accordance with at least one template by at least one computer processor, said at least one template being embodied within said at least one source file; and
c) generating executable code utilizing said parsed zone and rate data, wherein:
said executable code is executable without accessing said source file to: (1) receive one or more parameters related to a transaction, (2) perform a first lookup to identify a shipping zone based on at least one of said one or more parameters, (3) perform a second lookup to identify a shipping rate based on at least said shipping zone, and to provide said shipping rate required to complete said transaction.

22. A method for securing zone and rate data provided to a user, comprising:
a) scanning said zone and rate data from at least one source file comprising source data for at least one zone chart and at least one rate chart;
b) parsing said zone and rate data in accordance with at least one template by at least one computer processor, said at least one template being embodied within said at least one source file; and
c) generating executable code by at least one computer processor utilizing said parsed zone and rate data, wherein:
said executable code is executable without accessing said source file to: (1) receive one or more parameters related to a transaction, (2) perform a first lookup to identify a shipping zone based on at least one of said one or more parameters, (3) perform a second lookup to identify a shipping rate based on at least said shipping zone, and to provide said shipping rate to a user.

* * * * *